United States Patent [19]

Hartley

[11] Patent Number: 4,960,003

[45] Date of Patent: Oct. 2, 1990

[54] TRANSMISSION

[76] Inventor: Joseph A. Hartley, 5064 106th St., Omaha, Nebr. 68127

[21] Appl. No.: 389,601

[22] Filed: Aug. 4, 1989

[51] Int. Cl.⁵ ............................................. F16H 25/06
[52] U.S. Cl. ........................................ 74/63; 74/216.3
[58] Field of Search ....................... 74/63, 216.3, 424.5

[56]  References Cited

U.S. PATENT DOCUMENTS

| 2,612,312 | 9/1952 | Clarke | 230/185 |
| 2,764,030 | 9/1956 | Mackta | 74/216.3 |
| 2,855,783 | 10/1958 | Peters | 74/57 |
| 4,739,668 | 4/1988 | David | 74/63 |

FOREIGN PATENT DOCUMENTS

| 59-180153 | 10/1984 | Japan | 74/63 |
| 257052 | 8/1926 | United Kingdom | 74/63 |
| 355718 | 8/1931 | United Kingdom | 74/63 |

*Primary Examiner*—Leslie A. Braun
*Assistant Examiner*—Scott Anchell
*Attorney, Agent, or Firm*—Zarley, McKee, Thomte, Voorhees & Sease

[57] ABSTRACT

A transmission comprising an outer hollow stationary casing having first and second open ends, an outer surface and a cylindrical inner surface. The inner surface has a circumferentially extending, uniformly shaped first zigzag groove. A first hollow cylindrical member is rotatably mounted coaxially within the casing and has an axially aligned output shaft which extends outwardly from the second end of the casing. The cylindrical member has a plurality of transversely extending parallel slots extending therethrough which register with the first zigzag groove. A second hollow cylindrical member is rotatably mounted coaxially within the first cylindrical member and has an output connector extending outwardly from the closed end thereof. A circumferentially extending, uniformly shaped second zigzag groove is formed on the outer surface of the second cylindrical member and registers with a portion of each slot. A bearing is operably journaled within each slot and is received between the first and second zigzag grooves to rotatably support and operably connect the second cylindrical member within the first cylindrical member and the first cylindrical member within the casing.

3 Claims, 2 Drawing Sheets

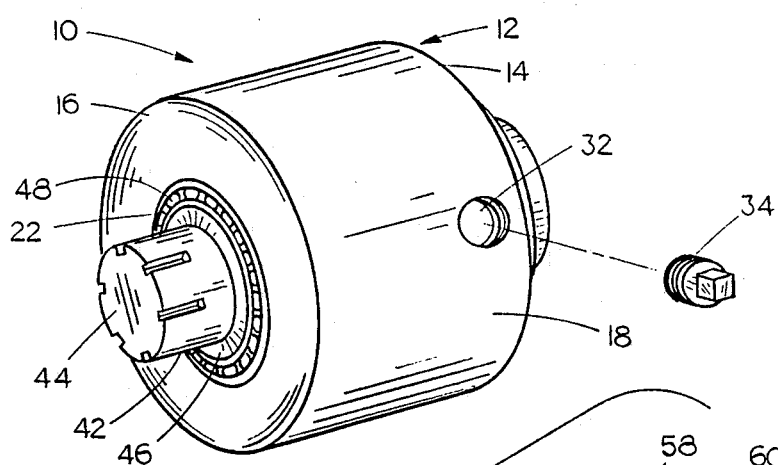
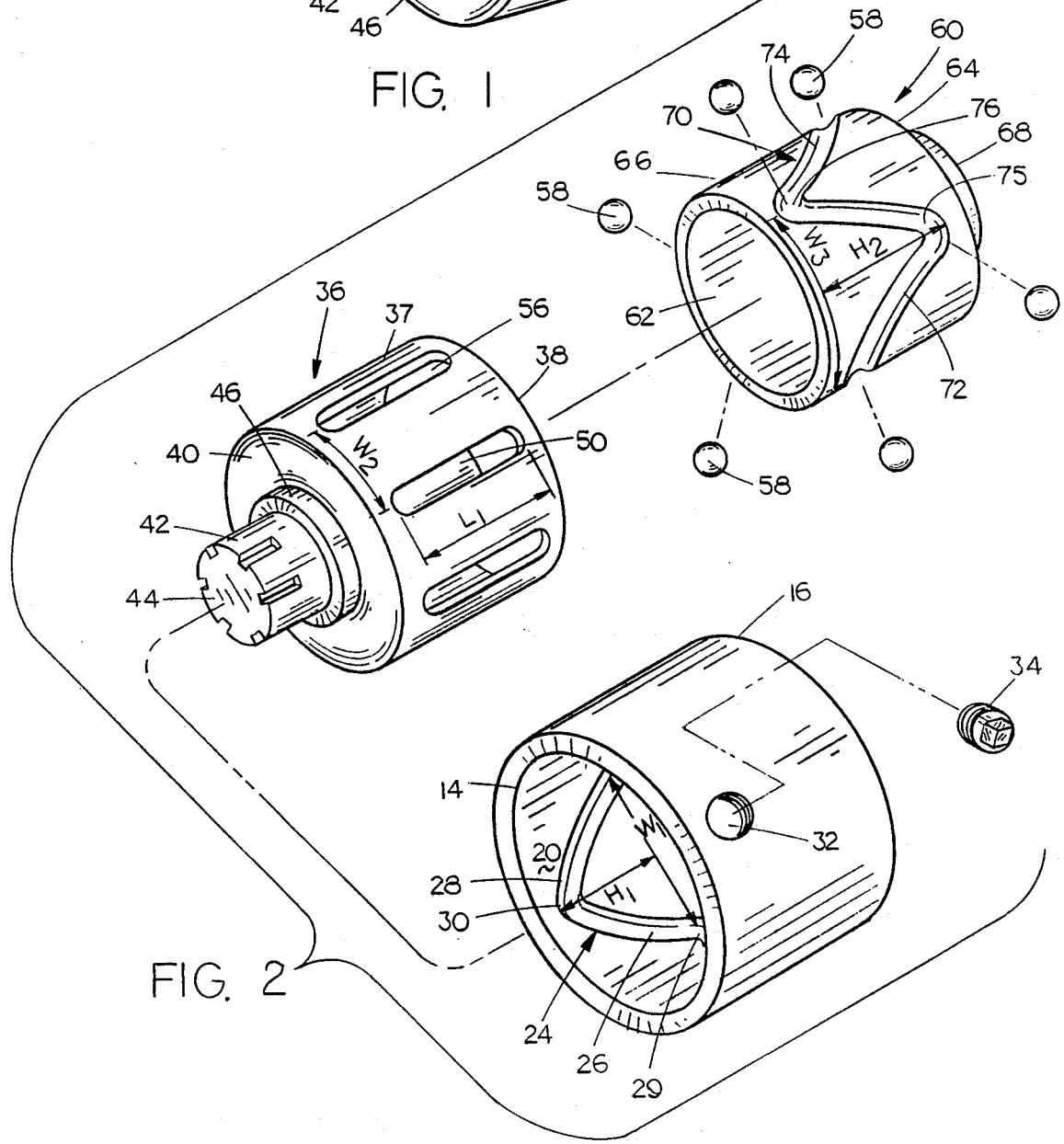
FIG. 1
FIG. 2

TRANSMISSION

TECHNICAL FIELD

This invention relates generally to a transmission and more specifically to an improved gearless, non-hydraulic transmission which is operably selectable between a reduced rotary output or a non-reduced output.

BACKGROUND OF THE INVENTION

It is well known in the art to utilize a transmission to alter rotary input to achieve the desired rotary output. Transmissions can be generally classified as either gear driven and/or hydraulically driven. The gear-driven transmission utilizes gears which are suitably arranged to alter the rotary input to achieve the desired rotary output. Some gear-driven transmissions only permit the rotary input to be converted to a set rotary output, while other gear-driven transmissions include means which permit the user to vary the rotary output by simply altering the arrangement of the gears.

The hydraulic transmission differs from the gear-driven type of transmission in that a fluid is pumped through a series of fluid passageways which are interconnected by a series of pressure sensitive valves. As the fluid is pumped therethrough, the fluid acts upon a rotary member so as to cause the same to rotate thereby producing the desired output. The hydraulic transmission normally produces variable output.

Both types of transmissions have a number of drawbacks associated therewith. Each type of transmission uses a large number of parts which require extensive machine tooling to manufacture. Except for the very simple single speed, geardriven type of transmission, the majority of transmissions are complicated to assemble and repair. A further problem is that a large number of parts must be maintained and stocked so as to be able to repair these transmissions when they fail.

Another problem with these transmissions is that they are inadequate when utilized with high output engines. These transmissions are subject to failure—breakage or slipping—due to the torque and stresses exerted by high output engines. The solution to these problems has been to increase the size of the components and/or to use stronger components. This increases the weight of the components, increases cost, reduces fuel efficiency, and potentially causes the loss of valuable room within the vehicle.

It is therefore a principle object of the present invention to provide an improved transmission which does not utilize a gear means or hydraulic means to alter rotary input to achieve the desired rotary output.

Another object of the present invention is to provide an improved transmission which has relatively few moving parts.

Still another object of the present invention is to provide a transmission which does not require extensive machine tooling and complicated fabrication techniques to produce the necessary components thereof.

A further object of the present invention is to provide a multiple speed transmission which is simple to manufacture, assemble and repair.

Also, an object of the present invention is to provide a transmission which is durable, light-weight, and does not require the use of massive parts to withstand the torque and stresses produced by high output engines.

An additional object of the present invention is to provide a transmission which will not slip.

These and other objects will become apparent to those of ordinary skill in the art.

SUMMARY OF THE INVENTION

The transmission of the present invention is formed from a stationary hollow casing having a first open end, a second closed end, an outer surface and a cylindrical inner surface. A circumferentially extending first zigzag groove is formed in the inner surface of the casing to define a continuous channel. The first zigzag groove is formed from a series of parallel uniformly spaced-apart zags and a series of parallel uniformly spaced-apart zigs. Each zig is positioned between a pair of zags so as to define first and second junctures. The zags are spaced apart at a width of $W_1$. The first zigzag groove has an amplitude of $H_1$. The second closed end has an aligned aperture. A first hollow cylindrical member is rotatably mounted coaxially within the casing. The first cylindrical member has a first open end a second closed end and an axially aligned output shaft projecting from the second end. The output shaft is journaled through the aperture. A plurality of uniformly spaced-apart transversely extending slots, which are adapted to receive a ball bearing, are cut therethrough. The slots have a length $L_1$ which is equal to $H_1$. The slots are positioned on the first cylindrical member such that each slot has a portion thereof which continuously registers with the first zigzag groove as the first cylindrical member rotates with respect to the casing. A second hollow cylindrical member is rotatably mounted coaxially within the first cylindrical member. The second cylindrical member has a first open end, a second closed end, an outer surface and an axially aligned input connector means projecting outwardly from the closed end. The second cylindrical member is mounted with its first end adjacent to the second end of said first cylindrical member. A circumferentially extending second zigzag groove is formed on the outer surface and defines a continuous channel. The second zigzag groove is formed from a series of parallel uniformly spaced-apart zags and a series of parallel uniformly spaced-apart zigs. Each zig is positioned between a pair of zags so as to define first and second junctures. Each zag is spaced apart at a width of $W_3$. The number of first and second junctures determines the number of slots formed on the first cylindrical member. The slots have a width $W_2$ therebetween which is equal to $\frac{1}{2} W_3$. The amplitude $H_2$ of the second zigzag groove is equal to $H_1$. The second zigzag groove is positioned on the second cylindrical member such that as the second cylindrical member rotates with respect to the first cylindrical member, each slot has a portion thereof which continuously registers with the second zigzag groove. Each slot has a bearing journaled therein with each bearing engaging the first and second zigzag groove to thereby rotatably support and operably connect the second cylindrical member within the first cylindrical member and the first cylindrical member within the casing.

BRIEF DESCRIPTION OF THE DRAWINGS

FIG. 1 is a perspective view of the present invention;

FIG. 2 is a perspective view of the components of the present invention; and

DESCRIPTION OF THE PREFERRED EMBODIMENT

Figure 3:
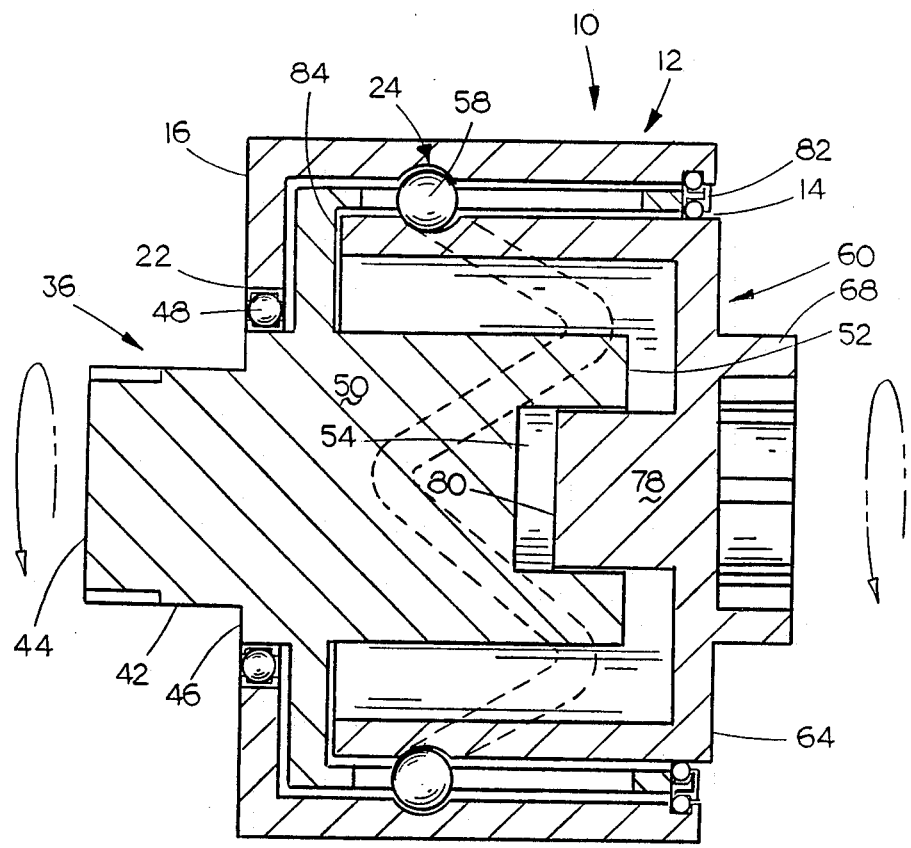
FIG. 3 is a cross-sectional view of the present invention.

Referring now to the drawings wherein corresponding parts are identified by the same reference numeral, the transmission of the present invention is generally identified at 10. The transmission 10 includes a stationary outer cylindrical casing 12 having a first open end 14, a partially closed second end 16, an outer surface 18 and a cylindrical inner surface 20. End 16 is provided with an axially aligned opening 22 formed therein.

A circumferentially extending "zigzag" groove 24 is formed in inner surface 20 of casing 12 and defines an endless channel extending completely around the inner surface 20. Groove 24 comprises alternating zags 26 (groove portions) and zigs 28 (groove portions). Zags 26 are uniformly angled with respect to the longitudinal axis of the casing 12 and have a width $W_1$ therebetween. Each zig 28 is positioned between a pair of zags so as to define first junctures 29 and second junctures 30 as seen in FIG. 2. The amplitude of the zigzag groove 24 is defined as $H_1$ (FIG. 2). The importance of the width $W_1$ and the amplitude $H_1$ will be discussed in more detail hereinafter. Casing 12 is provided with a bearing access port 32 formed therein which is positioned adjacent end 14 with the port 32 being in communication with a juncture 30 (not shown). A removable threaded plug 34 is used to close port 32.

A first hollow cylindrical member 36 is rotatably mounted coaxially within casing 12 as illustrated in FIG. 3. Cylindrical member 36 includes a body portion 37 having an open end 38 and closed end 40. An axially aligned output shaft 42 extends longitudinally from end 40 and has a diameter less than opening 22. The outermost end 44 of output shaft 42 is adapted to be engaged by a suitable device requiring rotary power (not shown). A shoulder 46 extends circumferentially about the base of output shaft 42 and provides a mount for a bearing assembly 48 which is received by opening 22, as seen in FIG. 3.

An inner shaft 50 is formed within the interior of cylindrical member 36 and projects from the closed end 40 and is axially aligned with output shaft 42 as seen in FIG. 3. The outside diameter of shaft 50 is considerably less than the inside diameter of body portion 37 and has a length which is slightly less than the length of body portion 37. Shaft 50 is provided with a recess 54 formed in the end thereof which is adapted to receive shaft 78 as will be described hereinafter.

A plurality of uniformly spaced-apart transversely extending parallel slots 56 are formed in the body portion 37 of cylindrical member 36 and have a length $L_1$. The longitudinal axes of the slots 56 are spaced apart a distance represented by $W_2$. The slots 56 are positioned in the body portion 37 such that each slot 56 has a portion thereof which registers with portions of groove 24. Each of the slots 56 have a width which permits a bearing 58 to be journaled or received therein. The width $W_2$ between each slot and the length $L_1$ thereof will be discussed in further detail hereinbelow.

A second hollow cylindrical member 60 is rotatably mounted coaxially within the first cylindrical member 36 as illustrated in FIG. 3. Cylindrical member 60 is provided with an open end 62, a closed end 64 and an outer surface 66. An axially aligned input connector means 68 projects outwardly from the closed end 64 for connection to a source of rotary output. A circumferentially extending zigzag groove 70 is formed on the outer surface 66 of cylindrical member 60 and defines a continuous channel formed of alternating zags (groove portions) 72 and zigs (groove portions) 74.

Zags 72 have an amplitude $H_2$ and are spaced so as to have a width $W_3$ therebetween. Each of zags 72 are positioned between a pair of zigs 74 to define first junctures 75 and second junctures 76 as seen in FIG. 2. Groove 70 is positioned on the second cylindrical member 60 such that each bearing 58, which is positioned within each slot 56, is permitted to simultaneously follow the first and second zigzag grooves 24 and 70 respectively. Although it is preferred that a bearing 58 and slot 56 be provided for each of the junctures 75 and 76, it is not necessary. In any event, the bearings 58 interconnect the components of the transmission as will be discussed in further detail hereinbelow.

Cylindrical member 60 is provided with an inner shaft 78 having an outer end 80 adapted to be partially received in the recess 54 as illustrated in FIG. 3. Bearing assembly 82 operably engages the outer surface 66 of cylindrical member 60 adjacent the closed end 64 and the inner surface 20 of cylindrical casing 12 adjacent open end 14 (FIG. 3).

The first zigzag groove 24, the second zigzag groove 70 and the slots 56 are interrelated. The amplitude $H_1$ of the first zigzag groove 24, the length $L_1$ of slots 56 and the amplitude $H_2$ of the second zigzag groove 70 are equal.

As previously stated, zags 28 have a width $W_1$ therebetween while zags 74 have a width of $W_3$ therebetween. As width $W_1$ increases, reduction in rotational output is increased because cylindrical member 60 must rotate farther to move bearings 58 along slots 56. However, as the width $W_1$ is decreased so as to create a first zigzag groove having a more acute angle as defined from the longitudinal axis of the casing 12, the rotational output is reduced because only a small amount of rotation of cylindrical member 60 is necessary to move bearings 58 along slots 56. Thus, the desired rotational output of the device may be achieved by varying the width $W_1$ and/or $W_3$.

Assembly of the transmission 10 is easily accomplished. Cylindrical member 36 is inserted within cylindrical casing 12 such that output shaft 42 is journaled through aperture 22 with the second closed end 40 of the first cylindrical member being positioned adjacent the second closed end 16 of the casing 12. Cylindrical member 60 is inserted within cylindrical member 36 such that output connector means 68 is positioned adjacent the end 40 of cylindrical member 36. Cylindrical member 36 is then manually rotated until a slot 56 is aligned with port 32. Cylindrical member 60 is then rotated until a juncture 75 of the zigzag groove 70 registers with port 32. A ball bearing 58 is then inserted through port 32 into the registering slot 56. This process is then repeated until all the slots 56 have a ball bearing 58 positioned therein. Plug 34 is used to operatively close the bearing access port 32 upon completion of the insertion of the bearings 58. Ball bearings 58 rotatably support the second cylindrical member 60 within cylindrical casing 12. The second bearing assembly 82 provides a second rotatable support means between the second cylindrical member 60 and the casing 12. Thus, the second cylindrical member 60 is prevented from wobbling within the structure.

Bearings 58 serve to operably connect the casing 12, the first cylindrical member 36 and the second cylindrical member 60. As cylindrical member 60 is rotated by the source of rotary output, the ball bearings 58 are forced to follow the first and second zigzag grooves 24 and 70 respectively. As ball bearings 58 follow the grooves, lateral pressure is exerted against the slots 56 thereby causing the first cylindrical member 36 to begin to rotate about its axis at a rotational speed less than the input speed due to the relationship of the grooves and slots.

The applicant has found that the use of zigzag grooves are critical to this invention. The applicant has discovered that by the use of zigzag grooves, an inwardly directed force on the second cylindrical member 60 (to the left as viewed in FIG. 3) causes the ball bearings 58 to be locked into position at junctures 75 and 76 of the zigzag groove 70. This locking effect causes the first and second cylindrical member 36 and 60 to become locked, thereby producing a non-reduced rotary output. Thus, the transmission is selectable between a reduced output and a non-reduced output. The present invention 10 can function as a two-speed transmission without having to utilize a complicated shifting means and/or devices to engage or disengage various components to produce the desired output since all that is needed is some means to permit selective inward force (to the left as viewed in FIG. 3) on member 60.

The applicant's invention can be readily manufactured by utilizing relatively simple machine tooling techniques and relatively simple machine tools. The device of the present invention was milled from solid blocks of metal. The use of solid blocks of metal provides the advantage that the component will have a uniform structural strength. It has also been found that this produces a transmission having superior strength, yet is compact and light weight. The transmission of the present invention can withstand the stresses and torque produced by modern engines. Although the applicant has utilized solid blocks of metal and machined the same into the transmission of the present invention, this does not preclude that other suitable manufacturing techniques could be utilized to produce the components of the present invention. Additionally, the applicant has found that there is no slippage with the present invention. Thus, it can be seen that the present invention accomplishes at least all of the above stated objectives.

I claim:

1. A transmission, comprising:
an outer hollow stationary casing means having a first open end, a second closed end, an outer surface and a cylindrical inner surface,
said second closed end having an axially aligned aperture extending therethrough,
said inner surfaces of said casing means having a circumferentially extending, uniformly shaped first zigzag groove formed therein having an amplitude $H_1$,
said first zigzag groove further comprising a series of uniformly spaced-apart zags, which are angled with respect to the longitudinal axis of said casing means, and a series of uniformly spaced-apart zigs, which are angled with respect to the longitudinal axis of the casing, each of said zigs being positioned between a pair of zags so as to define first and second junctures therebetween,
a first hollow cylindrical member rotatably mounted coaxially within said casing means,
said first cylindrical member having a first open end, a second closed end, an axially aligned output shaft means extending outwardly from said second end, and a plurality of circumferentially spaced apart longitudinally extending parallel slots extending therethrough,
said output shaft of said cylindrical member being journaled in said aperture in said second end of said casing means, each of said slots having a length L1 which is equal to $H_1$,
said slots being positioned on said first cylindrical member such that each of said slots has a portion thereof in constant register with said first zigzag groove as said first cylindrical member rotates with respect to said casing means,
a second hollow cylindrical member rotatably mounted coaxially within said first cylindrical member,
said second cylindrical member having a first open end, a second closed end, an input connector means extending outwardly from said closed end and coaxially with said output shaft means, and an outer surface,
said second cylindrical member mounted with its first end adjacent said first cylindrical member second end,
said outer surface of said second cylindrical member having a circumferentially extending, uniformly shaped second zigzag groove formed therein forming a continuous channel having an amplitude $H_2$,
said second zigzag groove comprising a series of parallel, uniformly spaced-apart zags which are angled with respect to the rotational axis of said second cylindrical member, and a series of parallel, uniformly spaced-apart zigs, which are angled with respect to the rotational axis of said second cylindrical member, each of said zigs being positioned between a pair of zags so as to define first and second, junctures,
said second zigzag groove being positioned on said outer surface of said second cylindrical member such that each of said slots has a portion thereof in constant register with said second zigzag groove as said second cylindrical member rotates with respect to said first cylindrical member,
a bearing operably journaled within each said slot, and between said first zigzag groove and said second zigzag groove, to thereby rotatably support and operably connect said second cylindrical member within said first cylindrical member and said first cylindrical member within said casing means,
the rotation of said input connector means causing the bearings to be moved along the length of said second groove and along the length of said first groove, the movement of said bearings in said grooves causing said first cylindrical member and said output connector means to be rotated,
selective axial movement of said second cylindrical member toward said first cylindrical member preventing the movement of said bearings in said grooves so that said output shaft will be rotated at the same speed as said input connector means,
said zags of said first zigzag groove being spaced apart at a width $W_1$; said zags of said second zigzag groove being spaced apart at a width of $W_3$; said $W_1$ being greater than $W_3$ to thereby proportionally reduce the rotation of said first cylindrical member with respect to the rotation of said second cylindrical member, and
each of said slots being spaced apart at a width of $W_2$, said $W_2$ being equal to $\frac{1}{2} W_3$.

2. The transmission of claim 1, wherein the number of said slots is equal to the number of first and second junctures of said second zigzag groove.

3. A transmission, comprising:

an outer hollow stationary casing means having a first open end, a second closed end, an outer surface and a cylindrical inner surface, said second closed end having an axially aligned aperture extending therethrough, said inner surfaces of said casing means having a circumferentially extending, uniformly shaped first zigzag groove formed therein having an amplitude $H_1$, said first zigzag groove further comprising a series of uniformly spaced-apart zags, which are angled with respect to the center axis of said casing means, and a series of uniformly spaced-apart zigs, which are angled with respect to the center axis of the casing, each of said zigs being positioned between a pair of zags so as to define first and second junctures therebetween, a first hollow cylindrical member rotatably mounted coaxially within said casing means, said first cylindrical member having a first open end, a second closed end, an axially aligned output shaft means extending outwardly from said second end, and a plurality of circumferentially spaced apart longitudinally extending parallel slots extending therethrough, said output shaft of said cylindrical member being journaled in said aperture in said second end of said casing means, each of said slots having a length L1 which is equal to $H_1$, said slots being positioned on said first cylindrical member such that each of said slots has a portion thereof in constant register with said first zigzag groove as said first cylindrical member rotates with respect to said casing means, a second hollow cylindrical member rotatably mounted coaxially within said first cylindrical member, said second cylindrical member having a first open end, a second closed end, an input connector means extending outwardly from said closed end and coaxially with said output shaft means, and an outer surface, said second cylindrical member mounted with its first end adjacent said first cylindrical member second end, said outer surface of said second cylindrical member having a circumferentially extending, uniformly shaped second zigzag groove formed therein forming a continuous channel having an amplitude $H_2$, said second zigzag groove comprising a series of parallel, uniformly spaced-apart zags which are angled with respect to the rotational axis of said second cylindrical member, and a series of parallel, uniformly spaced-apart zigs, which are angled with respect to the rotational axis of said second cylindrical member, each of said zigs being positioned between a pair of zags so as to define first and second, junctures, said second zigzag groove being positioned on said outer surface of said second cylindrical member such that each of said slots has a portion thereof in constant register with said second zigzag groove as said second cylindrical member rotates with respect to said first cylindrical member, a bearing operably journaled within each said slot, and between said first zigzag groove and said second zigzag groove, to thereby rotatably support and operably connect said second cylindrical member within said first cylindrical member and said first cylindrical member within said casing means, the rotation of said input connector means causing the bearings to be moved along the length of said second groove and along the length of said first groove, the movement of said bearings in said grooves causing said first cylindrical member and said output connector means to be rotated, selective axial movement of said second cylindrical member toward said first cylindrical member preventing the movement of said bearings in said grooves so that said output shaft will be rotated at the same speed as said input connector means, said zags of said first zigzag groove being spaced apart at a width $W_1$; said zags of said second zigzag groove being spaced apart at a width of $W_3$; said $W_1$ being greater than $W_3$ to thereby proportionally reduce the rotation of said first cylindrical member with respect to the rotation of said second cylindrical member, each of said slots being spaced apart at a width of $W_2$, said $W_2$ being equal to ½ $W_3$, and said second zigzag groove permitting said bearing means to be positioned at said first and second junctures of said second zigzag groove when longitudinal pressure is applied to said second cylindrical member, so as to cause said second cylindrical member to engage said first cylindrical member in a locked relationship thereby causing said second cylindrical member and said first cylindrical member to rotate at the same speed.

* * * * *